(12) United States Patent
Hartwich et al.

(10) Patent No.: US 12,534,410 B2
(45) Date of Patent: Jan. 27, 2026

(54) REFRACTORY LINING DESIGN AND STEEL PRACTICE FOR LOW REFRACTORY WASTE, AND REFRACTORY BASED ON RECLAIMED LOW-IMPURITY MAGNESIA-CARBON AGGREGATE

(71) Applicant: HarbisonWalker International Holdings, Inc., Moon Township, PA (US)

(72) Inventors: David Hartwich, Bethel Park, PA (US); Samantha Garnier, Pittsburgh, PA (US)

(73) Assignee: HarbisonWalker International Holdings, Inc., Moontownship, PA (US)

( * ) Notice: Subject to any disclaimer, the term of this patent is extended or adjusted under 35 U.S.C. 154(b) by 591 days.

(21) Appl. No.: 17/967,981

(22) Filed: Oct. 18, 2022

(65) Prior Publication Data

US 2023/0212077 A1    Jul. 6, 2023

Related U.S. Application Data

(60) Provisional application No. 63/296,912, filed on Jan. 6, 2022.

(51) Int. Cl.
*C04B 35/04* (2006.01)
*B02C 23/16* (2006.01)
(Continued)

(52) U.S. Cl.
CPC .............. *C04B 35/04* (2013.01); *B02C 23/16* (2013.01); *C04B 14/304* (2013.01);
(Continued)

(58) Field of Classification Search
CPC ..... C04B 35/04; C04B 14/304; C04B 35/043; C04B 35/62204; B02C 23/16; F27D 1/0006
(Continued)

(56) References Cited

U.S. PATENT DOCUMENTS 5,318,933 A * 6/1994 Sundell .................. C04B 35/66
    501/109
6,464,932 B1 * 10/2002 Nomura ................ C04B 35/013
    266/286
(Continued)

FOREIGN PATENT DOCUMENTS

CN    101811881 A    8/2010
CN    202968608 U    6/2013
(Continued)

OTHER PUBLICATIONS

Horckmans, L et al. (Recycling of refractory bricks used in basic steelmaking: A review Resource , Conservation & Recycling, www.elsevier.com/locate/resource, Sep. 22, 2018 (Year: 2018).*
Horckmans, L et al., "*Recycling of refractory bricks used in basic steelmaking: A review*," Resources, Conservation & Recycling, www.elsevier.com/locate/resconrec, Sep. 22, 2018.
(Continued)

*Primary Examiner* — Jessee R Roe
*Assistant Examiner* — Michael Aboagye
(74) *Attorney, Agent, or Firm* — RENNER, OTTO, BOISSELLE & SKLAR, LLP (57) ABSTRACT

A metallurgical vessel structure and method is provided for producing low-impurity Magnesia-Carbon reclaimed aggregate suitable for reuse in the production of high purity Magnesia-Carbon refractory. A metallurgical vessel is assembled with a non-reactive or chemically similar backup lining. The entire height of the working lining wall is Magnesia-Carbon brick suitable for reuse. The working lining is exposed to a metal making high temperature process, and the working lining is sequentially demolished.
(Continued)

Due to the assembly of vessel, metallurgical practice, and ease of demolishing the vessel, there is little to no need for sorting, such that the used Magnesia-Carbon brick are easily converted into low impurity Magnesia-Carbon reclaimed aggregate. A refractory composed of low-impurity Magnesia aggregate reclaimed from the method is also contemplated.

30 Claims, 4 Drawing Sheets (51) Int. Cl.
| | |
|---|---|
| C04B 14/30 | (2006.01) |
| C04B 35/043 | (2006.01) |
| C04B 35/622 | (2006.01) |
| F27D 1/00 | (2006.01) |
| F27D 25/00 | (2010.01) |

(52) U.S. Cl.
CPC ...... *C04B 35/043* (2013.01); *C04B 35/62204* (2013.01); *F27D 1/0006* (2013.01); *C04B 2235/3206* (2013.01); *C04B 2235/3821* (2013.01); *C04B 2235/424* (2013.01); *C04B 2235/425* (2013.01); *C04B 2235/9607* (2013.01); *C04B 2235/9676* (2013.01); *F27D 2001/0046* (2013.01); *F27D 25/00* (2013.01)

(58) Field of Classification Search
USPC .................................. 266/280, 197, 200, 286
See application file for complete search history.

(56) References Cited

U.S. PATENT DOCUMENTS

| | | | |
|---|---|---|---|
| 8,030,235 | B2 | 10/2011 | Miglani et al. |
| 2010/0065977 | A1* | 3/2010 | Quigley ................ F27D 3/1536 264/30 |
| 2016/0215979 | A1* | 7/2016 | Kaldon .................... F27D 1/04 |

FOREIGN PATENT DOCUMENTS

| | | | |
|---|---|---|---|
| CN | 104673965 A | 6/2015 | |
| CN | 107243623 A | 10/2017 | |
| CN | 110423100 A | 11/2019 | |
| CN | 110923396 A | 3/2020 | |
| CN | 111187875 A | 5/2020 | |
| EP | 3705463 * | 9/2020 | ............ C04B 35/14 |
| FR | 2 296 485 A1 | 7/1976 | |
| GB | 2 131 790 A | 6/1984 | |
| JP | 61-033744 A2 | 2/1986 | |
| JP | 2018-16515 A | 2/2018 | |
| WO | WO-2010/074309 A1 | 7/2010 | |

OTHER PUBLICATIONS

Moshtaghioun, et al, "Analyze complex phases of slag-tundish plaster reactions by modified XRD ration of slopes method for some kinetic considerations", Journal of Materials Processing Technology, vol. 196 (2008), pp. 52-63.

International Search Report issued in corresponding International Application No. PCT/US2022/053769 dated May 5, 2023.

Written Opinion issued in corresponding International Application No. PCT/US2022/053769 dated May 5, 2023.

* cited by examiner

REFRACTORY LINING DESIGN AND STEEL PRACTICE FOR LOW REFRACTORY WASTE, AND REFRACTORY BASED ON RECLAIMED LOW-IMPURITY MAGNESIA-CARBON AGGREGATE

RELATED APPLICATIONS

This application claims the benefit of U.S. Provisional Application No. 63/296,912 filed Jan. 6, 2022, which is hereby fully incorporated herein by reference.

FIELD OF THE INVENTION

The present invention relates generally to refractory linings, and more particularly, to a refractory lining design and method for producing and reusing reclaimed low-impurity Magnesia-Carbon aggregate from a refractory having said design.

BACKGROUND OF THE INVENTION

Magnesia-Carbon bricks are broadly used for the lining construction of metallurgical vessels used to produce or refine metals, such as steel. Magnesia-Carbon bricks are the dominant linings in basic oxygen furnaces (BOF), electric arc furnaces (EAF), ladle metallurgical furnaces (LMF) and steel teeming or steel transfer ladles. Key useful characteristics of Magnesia-Carbon bricks include high refractoriness and high corrosion resistance against basic, typically calcium rich slags.

After reaching their useful life the linings of metallurgical vessels are demolished, the metallurgical vessel is cleaned or repaired and subsequently relined with new Magnesia-Carbon brick linings. The demolished used linings are either disposed or subjected to one of the common reclaiming processes.

It is estimated that the total volume of demolished Magnesia-Carbon linings available is about 3 to 5 lbs. per ton of steel produced. This is a large volume of material that, if not reclaimed and improved, has limited value. Further, since Magnesium Oxide (MgO) hydrates and disintegrates over time, Magnesia-Carbon bricks are not easily recyclable into roadway aggregate or other secondary construction applications in the same way that alumina-containing materials, or other non-hydratable refractory materials or slags, can be recycled.

While Magnesia-Carbon bricks can be recycled, all of the known beneficiation methods have significant limitations with regard to the final properties of the reclaimed aggregate, the yield of the useable aggregate, or the cost of the useable aggregate compared to costs of virgin ingredients used for the production of Magnesia-Carbon brick.

Reclaiming used Magnesia-Carbon bricks from steel applications for use in high quality refractory products is difficult due to the contamination that can arise from a number of factors. One such contamination can be due to different refractory compositions (Alumina-Magnesia-Carbon (AMC) brick, Magnesia-Alumina-Carbon (MAC) brick, Non-Magnesia Castables, Alumina, or Alumina-Silica, or Olivine materials, or Dolomitic based backfill that are used throughout the Steel vessel; and to a highly variable magnesia brick and monolithic compositions in EAF furnace. An example of this contamination was shown after grinding, when the tested samples of reclaimed material averaged 69.5% MgO and 23.2% $Al_2O_3$, which implies a high amount of AMC brick contamination and disqualifies the reclaimed material from being used as Magnesia-Carbon bats or recycle. Another form of contamination can be due to incompatible backfill adherence and metallurgical slag adherence to the remnant Magnesia-Carbon brick. An example of this contamination was observed in the sorted reclaimed material, where it was found the contamination being 12% from Alumina-Silica containing backup lining and 5% from calcium rich slag. The metal carbides found in many typical Magnesia-Carbon brick, which are the target of reclaim efforts, act as contaminants themselves. The metal carbides are typically generated during the high temperature service. In this regard, it has been found that the chemistry of the sized and sorted reclaimed material obtained after a passivation process of metal carbides is much lower in Magnesia content than the original refractory products. Other sources of contamination were found to be due to metal adhering to remnant Magnesia-Carbon brick. These contaminants significantly limit the further use of the reclaimed aggregate and excludes the viability for use in any Magnesia-Carbon brick products.

SUMMARY OF THE INVENTION

The present invention provides a design of a vessel (Steel ladle, EAF furnace, etc.) that is assembled from high purity magnesia-carbon brick, or high purity magnesia-carbon brick separated from other non-magnesia-carbon brick lining components; and when performing a recycling operation on the vessel, no post-sorting of the brick is required after tear-out. In particular, the vessel is composed of easily recyclable brick that can be recycled into high quality refractory products.

Further, to minimize the inclusion of impurities in the reclaimable brick residues, the liquid slag can be mechanically separated from liquid steel at slag-skimming stations, where the vessel is tilted forward and with help of a rake the slag is scrapped into a slag pot parked beneath the vessel, or by pouring slag off when tipping the vessel such that the slag runs over the side of the vessel. This practice occurs prior to tapping and is sometimes performed prior to additional treatment in a vacuum tank degasser. Additionally, or alternatively, metallurgical practices can be used during the last heat cycle prior to tear-out to remove slag from the brick. Further, fluorspar or other slag-melting additive can be introduced in the last batch of steel to create a runny slag that only thinly coats the Magnesia-Carbon brick, thereby reducing the total amount of potential contaminants on the brick. Higher tap temperatures also may be utilized to lower the viscosity of the slag thereby creating a thin coating. Additionally, or alternatively, the working lining of the vessel can be subjected to a high-heat thermal cycle, which can melt away and reduce the amount of slag remaining on the brick and/or decrease the adhesion for ease removal of the slag from the brick. Another method includes tailoring the chemistry of the slag to form dicalcium silicate that, during cooling, transitions from β dicalcium silicate to γ dicalcium silicate causing a 10% volume increase and dusting of the slag, which falls off the working lining brick. Yet another method includes tailoring the chemistry of the slag to form calcium aluminate-type slag that, after service, hydrates and causes the slag to decompose to dust and fall off of the working lining brick. The dusts in both methods can be removed from the working lining bricks through a simple screening process.

An advantage of the present invention is that it can easily produce contamination-free (low impurity) Magnesia-Carbon reclamation product. This low impurity reclaimed Magnesia-Carbon product can be converted into an aggregate for production of a high quality refractory product that displays equal performance characteristics to virgin product made with no recycled material.

According to one aspect of the invention, a method of producing low-impurity Magnesia-Carbon reclaimed aggregate suitable for reuse in the production of high purity Magnesia-Carbon refractory includes: assembling a refractory with a backup lining comprising at least one of magnesium oxide-based brick, or aluminum oxide-based brick, or aluminum oxide-based monolithic and a working lining with at least one surface of the working lining adjacent to the backup lining, wherein the working lining comprises Magnesia-Carbon; exposing the working lining to a metal making high temperature process; sequentially demolishing the working lining, and separating the Magnesia-Carbon brick; and converting the separated Magnesia-Carbon brick into low impurity Magnesia-Carbon reclaimed aggregate.

In one embodiment, assembling the refractory includes preventing the at least one surface of the working lining adjacent to the backup lining from adhering to the backup lining.

In one embodiment, exposing the working lining includes finishing the working lining with one of a thermal de-slagging process or chemical de-slagging process.

In one embodiment, finishing includes performing a destructive phase transition de-slagging process to tailor a chemistry of the slag to form dicalcium silicate that during cooling transforms from β to γ and causes the slag to dust and fall off of the working lining brick.

In one embodiment, finishing includes performing a destructive hydration de-slagging process to hydrate calcium aluminate-type slag after service and cause the slag to decompose to dust and fall off of the working lining brick.

In one embodiment, the method further includes using a screening process to remove the dust from other components.

In one embodiment, finishing includes mechanical separation by skimming or pouring slag off the vessel before tapping.

In one embodiment, finishing includes performing a thermal de-slagging process to the working lining to decrease a viscosity of the slag.

In one embodiment, the thermal de-slagging process includes subjecting the working lining to a final batch of molten metal that is between 100 degrees F. and 500 degrees F. higher than a melting temperature of a batch of molten metal contacting the working lining just prior to the final batch, or subjecting the working lining to a final batch of molten metal that is above 3000 degrees F.

In one embodiment, assembling the refractory includes forming a gap between the backup lining and the working lining, and filling the gap with magnesia based backfill.

In one embodiment, assembling the refractory includes using, as the backfill, Magnesia monolithic having a Magnesia content exceeding 80 percent.

In one embodiment, assembling the refractory includes using Magnesia monolithic as the backfill, the Magnesia monolithic being at least one of castable, gunning mix, spray, ramming mix, dry-vibratable or plastic.

In one embodiment, converting comprises using at least one of magnetic separation of remnant metal or hydration and physical separation of slag to convert the separated Magnesia-Carbon brick into low impurity Magnesia-Carbon reclaimed aggregate.

In one embodiment, assembling the refractory includes using Magnesia-Carbon brick having a purity of Magnesia aggregate that is greater than 95% as the working lining.

In one embodiment, assembling the refractory includes using metal-free Magnesia-Carbon brick as the working lining.

In one embodiment, assembling the refractory includes using Magnesia-Carbon brick for the working lining, the Magnesia-Carbon brick comprising at least one carbon particulate in a range of 2 wt % to 20.0 wt %, the carbon particulate including at least one of natural flake graphite, vein graphite, synthetic graphite, expanded flake graphite, expandable graphite, carbon black, carbon fiber, and powdered pitch, and a binder in a range of 0.5 wt % to 5.0 wt %, the binder including at least one of phenolic resol resin, novolac resin, coal tar pitch, or petroleum pitch.

In one embodiment, assembling the refractory includes using Magnesia-Carbon brick for the working lining, the Magnesia-Carbon brick comprising at least one anti-oxidation additive in a range of 0.25 wt % to 5.0 wt %, the anti-oxidation additive including at least one of metal, carbide, boride, and nitride.

According to another aspect of the invention, a refractory that is resistant to steelmaking temperatures and steelmaking slags, includes Magnesia-Carbon brick formed from low impurity Magnesia-Carbon reclaimed aggregate prepared according to the method of any one of claims 1-17.

In one embodiment, the Magnesia-Carbon brick is formed from up to 80% of the low impurity Magnesia-Carbon reclaimed aggregate.

In one embodiment, the Magnesia-Carbon brick is formed from at least one of complementary Magnesia sintered aggregate having Magnesia content above 95% or Magnesia fused aggregate having Magnesia content above 95%.

In one embodiment, the refractory comprises monolithic having up to 80% of low impurity Magnesia-Carbon reclaimed aggregate.

In one embodiment, the monolithic comprises at least one of complementary Magnesia sintered aggregate, Magnesia fused aggregate, or Magnesia-dolomite aggregate.

According to another aspect of the invention, a lining construction for a metallurgical vessel used to produce or refine metals includes: a working lining having a first working lining side and a second working lining side opposite the first working lining side, the first working lining side facing an inner molten-metal holding region of the metallurgical vessel, the working lining comprising Magnesia-Carbon brick formed from low-impurity Magnesia-Carbon reclaimed aggregate obtained according to the methods described herein.

In one embodiment, the lining construction includes a Magnesia-based backfill disposed between the backup lining and the working lining.

In one embodiment, the backfill of the lining construction comprises Magnesia monolithic having a Magnesia content exceeding 80 percent.

In one embodiment, the Magnesia monolithic comprises one of castable, gunning mix, spray, ramming mix, dry-vibratable or plastic.

In one embodiment, the working lining comprises a barrel region, a lower slag line region, an upper slag line region and a freeboard region, the lower slag line region between the barrel region and the upper slag line region, and the upper slag line region between the lower slag line region and the freeboard region, and wherein each of the barrel region, the lower slag line region, the upper slag line region and the freeboard region comprise Magnesia-Carbon brick.

In one embodiment, the lining construction includes a bottom lining arranged adjacent to the barrel region, wherein the bottom lining comprises Aluminum Oxide based refractory.

In one embodiment, the bottom lining comprises a first bottom lining side and a second bottom lining side opposite the first bottom lining side, the first bottom lining side facing the inner molten-metal holding region.

In one embodiment, the lining construction includes a sub-bottom lining in contact with the second bottom lining side.

In one embodiment, the sub-bottom lining is in contact with at least one of the barrel region or the backup lining.

In one embodiment, the lining construction includes a flange distal from the bottom lining and adjacent to the working lining and the backup lining.

In one embodiment, the Magnesia-Carbon brick of the lining construction includes: at least one carbon particulate in a range of 2 wt % to 20.0 wt %, the carbon particulate including at least one of natural flake graphite, vein graphite, synthetic graphite, expanded flake graphite, expandable graphite, carbon black, carbon fiber, and powdered pitch; and a binder in a range of 0.5 wt % to 5.0 wt %, the binder including at least one of phenolic resol resin, novolac resin, coal tar pitch, or petroleum pitch.

In one embodiment, the Magnesia-Carbon brick of the lining construction further includes at least one anti-oxidation additive in a range of 0.25 wt % to 5.0 wt %, the anti-oxidation additive including at least one of metal, carbide, boride, and nitride.

In one embodiment, the Magnesia-Carbon brick of the lining construction includes up to 80% of low impurity Magnesia-Carbon reclaimed aggregate.

In one embodiment, the metallurgical vessel comprises one of an electric arc furnace, a steel ladle, or a basic oxygen furnace.

Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well-known process operations have not been described in details so as to not unnecessarily obscure the present invention.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Various aspects of the invention now will be described more fully hereinafter. Such aspects, however, may be embodied in many different forms and should not be construed as limited to the embodiments set forth herein; rather, these embodiments are provided so that this disclosure will be thorough and complete, and will fully convey its scope to those skilled in the art.

The word "about" when immediately preceding a numerical value means a range of plus or minus 10% of that value, e.g., "about 50" means 45 to 55, "about 25,000" means 22,500 to 27,500, etc., unless the context of the disclosure indicates otherwise, or is inconsistent with such an interpretation. For example, in a list of numerical values such as "about 49, about 50, about 55, "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

As used herein, the term "refractory material" refers to inorganic nonmetal materials utilized in various high-temperature equipment, e.g., steel production and the like. Refractory materials are characterized by a high melting point, and when exposed to high temperatures they do not lose their strength and of form.

A device and method in accordance with the present invention enable a used Magnesia-Carbon Brick working lining of a metallurgical vessel to be reclaimed without contamination from other refractory sources (e.g., without contamination from AMC brick, MAC brick, Non-Magnesia Castable, Alumina or Alumina-Silica or Olivine or Dolomitic based backfill). In accordance with the invention, the linings of the metallurgical vessel are selected such that during demolition and subsequent separation, contamination of the reclaimed materials is reduced. More particularly, the working lining (i.e., the lining that in normal use is in contact with molten metal or molten slag) of the metallurgical vessel is formed as an all Magnesia-Carbon working lining. This includes the Freeboard, Slagline, and Barrel sections of the metallurgical vessel. By forming an all Magnesia-Carbon working lining, operator error is reduced during tear out, thereby eliminating contamination from AMC, MAC, and/or dolomite brick.

Preferably, the Magnesia-Carbon brick is metal-free. The basis for metal-free Magnesia-Carbon brick is that Aluminum Carbides are not stable and hydrate into Aluminum Hydroxide and methane gas. Although additional processing can be performed to accelerate this reaction (thereby passivating (hydrating) the material before use in brick making), the resulting Aluminum Hydroxide and other metal oxides/ hydroxides/carbides can act as contaminants when reused as an aggregate in brick making. Metal-free Magnesia-Carbon bricks avoid such contamination due to the lack of metals in the brick. Table 1 shows the superiority of metal-free brick vs. metal containing brick.

TABLE 1

Chemistry of metal containing brick vs. metal free brick

| Calcined Chemistry | Unused High Purity Magnesia Carbon Brick (contains 3.5% Al and Si metal) | Unused High Purity Magnesia-Carbon Brick (contains no metal addition) |
|---|---|---|
| Silica ($SiO_2$), % | 2.11 | 0.42 |
| Alumina ($Al_2O_3$), % | 5.50 | 0.24 |
| Iron Oxide ($Fe_2O_3$), % | 0.55 | 0.27 |
| Lime (CaO), % | 1.20 | 1.37 |
| Magnesia (MgO), % | 90.50 | 97.67 |

As can be seen in Table 1, the percentage of Magnesia is significantly higher and the percentage of Alumina and Silica are significantly lower in the metal-free brick relative to the metal containing brick. This higher amount of Magnesia and lower amount of Alumina and Silica results in much less contaminants in the reclaimed material.

In addition to utilizing an all Magnesia-Carbon working lining, the backup lining (i.e., the lining contacting the portion of the working lining that is not in contact with the molten metal) should be chemically similar to the target Magnesia-Carbon brick chemistry. In this manner, if some of the backup lining is inadvertently collected during the tear out, the collected backup lining will not act as an impurity. In addition, it is preferable that the backup lining does not melt and does not adhere to the target Magnesia-Carbon brick. The backup lining, for example, can include at least one of Magnesia-type brick (80% MgO or higher) or Magnesia-based backfill (80% MgO or higher). For example, an acceptable composition of the backup lining is as follows:

80-98 MgO
0.2-5 $SiO_2$
0.8-5 CaO
0.2-7 $Al_2O_3$
0.1-3 $Fe_2O_3$

A less desirable but acceptable composition of the backup lining is an Aluminum Oxide ($Al_2O_3$)-type brick, monolithic, or backfill that will not adhere to the working lining which is to be reclaimed. In addition Dolomite-based or Olivine-based backfill that is not prone to sintering and will not adhere to the working lining is also less desired but acceptable. Forming the backup lining using these guidelines improves the quality of the torn-out Magnesia-Carbon bricks by ensuring no contamination is introduced by the backup lining.

Figure 1:
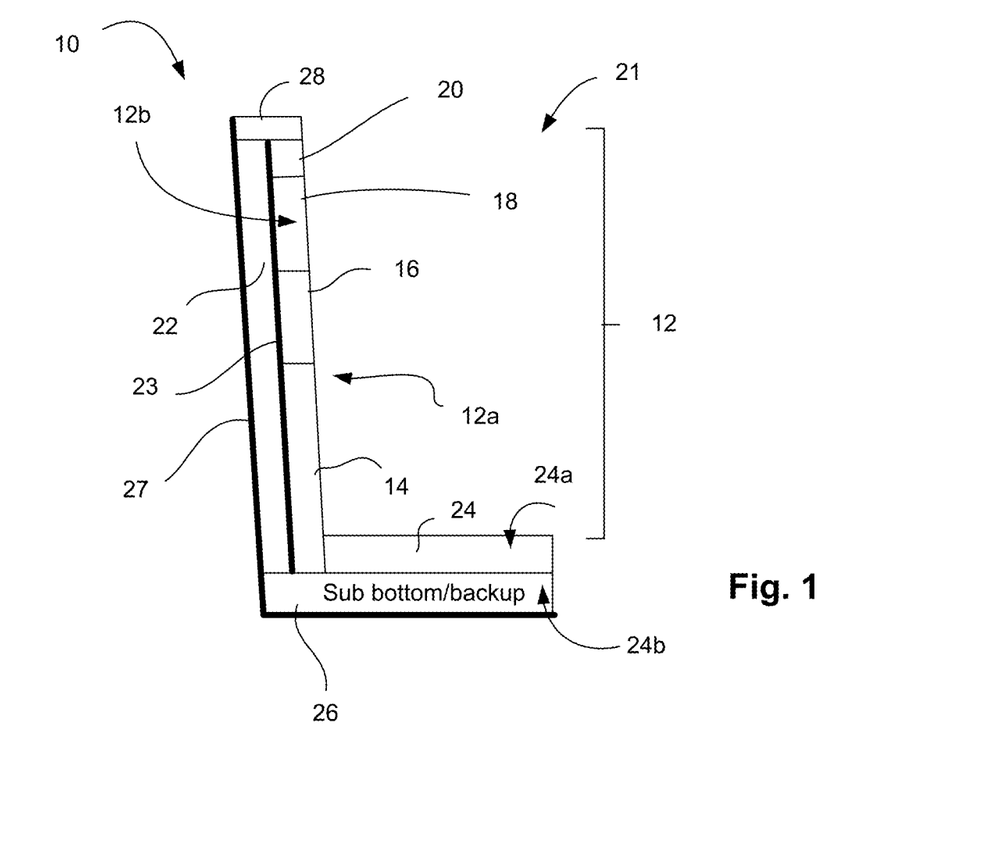
FIG. 1 is a simple schematic view of an exemplary metallurgical vessel constructed in accordance with the invention.

Referring to FIG. 1, illustrated is a lining construction for a metallurgical vessel 10 used to produce or refine metals in accordance with aspects of the invention. The lining construction includes a working lining 12 formed from Magnesia-Carbon brick, the working lining 12 including a barrel region 14, a lower slag line region 16, an upper slag line region 18 and a freeboard region 20 (each of the barrel region 14, the lower slag line region 16, the upper slag line region 18 and the freeboard region 20 being formed from Magnesia-Carbon brick). As shown in FIG. 1, the lower slag line region 16 is between the barrel region 14 and the upper slag line region 18, and the upper slag line region 18 is between the lower slag line region 16 and the freeboard region 20. The working lining 12 has a first working lining side 12a and a second working lining side 12b opposite the first working lining side 12a, where the first working lining side 12a faces an inner molten-metal and molten slag holding region 21 of the metallurgical vessel 10.

The Magnesia-Carbon brick utilized in the working lining 12 preferably comprises at least one magnesia fused aggregate having magnesia content above 95% or magnesia sintered aggregate having magnesia content above 95%. The Magnesia-Carbon brick utilized in the working lining 12 preferably also comprises at least one carbon particulate and a binder. The carbon particulate can be in a range of about 2 wt % to 20.0 wt % and include at least one of natural flake graphite, vein graphite, synthetic graphite, expanded flake graphite, expandable graphite, carbon black, carbon fiber, powdered pitch or the like. The binder can be in a range of about 0.5 wt % to 5.0 wt % and include at least one of phenolic resol resin, novolac resin, coal tar pitch, petroleum pitch or the like. In one embodiment, the Magnesia-Carbon brick includes one or more anti-oxidation additives in a range of about 0.25 wt % to 5.0 wt %, where the one or more anti-oxidation additives include at least one of metal, carbide, boride, and nitride.

The lining construction further includes a backup lining 22 formed from one or more of Magnesium Oxide-based brick, or Aluminum Oxide-based brick, either burned or resin bonded, or Aluminum Oxide-based brick or monolithic. The backup lining 22 is adjacent to working lining 12 and both linings do not adhere to each other. The backup lining 22 is alternatively separated from the working lining 12 by a layer of Magnesium Oxide-based backfill 23, e.g., a Magnesia-based monolithic 23 having a Magnesia content exceeding 80 percent. The Magnesia-based monolithic can include one or more of castable, gunning mix, spray, ramming mix, dry-vibratable or plastic, or the like. The backfill 23 is in contact with both the backup lining 22 and the working lining 12. As will be seen below, the lining construction of the metallurgical vessel enables the Magnesia-Carbon bricks to be easily recycled with minimal risk of contamination.

The lining construction further includes a bottom lining 24 arranged adjacent to the barrel region 14. The bottom lining 24 is formed, for example, from Aluminum Oxide based refractory and includes a first bottom lining side 24a and a second bottom lining side 24b opposite the first bottom lining side 24a, where the first bottom lining side 24a faces the inner molten-metal holding region 21. A sub-bottom lining 26 is formed, for example, also from Aluminum Oxide based refractory and is disposed under and in contact with the second bottom lining side 24b. As can be seen in FIG. 1, the sub-bottom lining 26 is arranged under the backup lining 22 and working lining 12 such that the sub-bottom lining 26 is in contact with a bottom portion of the barrel region 14 and a bottom portion of the backup lining 22, i.e., the sub-bottom lining 26 supports the working lining 12, the backup lining 22 and the bottom lining 24. Such bottom construction is typically referred as Plug bottom. Alternatively, the bottom lining 24 could be installed over sub-bottom lining 26 after the back-up lining 22 is constructed and prior to the installation of working lining 12. Such bottom construction is referred as Full bottom. Arranged along a top portion of the lining construction is a flange 28 (also referred to as a lip ring), the flange 28 being distal from the bottom lining 24 and adjacent to a top edge surface of the working lining 12 (in particular the freeboard 20) and the backup lining 22. The sub-bottom lining 26 and backup lining 22 are supported by a steel structure 27 that defines the outer dimensions of the vessel.

According to another aspect of the invention, a ladle, a mechanical process and metallurgical process is provided that can reduce slag build up on brick prior to tear-out. To achieve such reduced slag buildup, the design of the ladle as disclosed herein can help with reducing refractory contaminants. However, steelmaking contaminants should also be reduced to achieve a contamination-free (low impurity) Magnesia-Carbon reclamation product.

Slag build up can account for upwards of 10% by weight of a working lining tear out. The liquid slag can be mechanically separated from liquid steel at slag-skimming stations, where the ladle is tilted forward and with help of a rake the slag is scrapped into a slag pot parked beneath the ladle, or by pouring slag off when tipping the vessel such that the slag runs over the side of the ladle. Additionally, or alternatively, Fluorspar can be introduced in the last batch of steel to create a runny slag that only thinly coats the Magnesia-Carbon brick, thereby reducing the total amount of potential contaminants on the brick. Higher tap temperatures also may be utilized to lower the viscosity of the slag. Additionally or alternatively, the working lining of the vessel can be subjected to high-heat thermal cycle, which can melt away and reduce the amount of slag remaining on the brick and/or decrease the adhesion for ease removal of the slag from the brick. Another method includes tailoring the chemistry of the slag to form dicalcium silicate that, during cooling, transitions from $\beta$ dicalcium silicate to $\gamma$ dicalcium silicate causing a 10% volume increase and dusting of the slag which falls off the working lining brick. It is important that the slag is not quenched to allow for the transition of $\alpha$-C2S to $\beta$-C2S. The transition of $\beta$-C2S to $\gamma$-C2S occurs at 525 C, causing a 10% volume increase and dusting of the slag. The CaO of the slag must be greater than 40% by weight and the $CaO:SiO_2$ ratio must be greater than 1.4 by weight to form dicalcium silicate. Preferably, the $CaO:SiO_2$ ratio is between 1.4 to 1.87 by weight %, but ratios above 1.87 are permissible when Tri and Di Calcium Silicate can exist together. Yet another method includes tailoring the chemistry of the slag to form calcium aluminate-type slag, which after service hydrates and causes the slag to decompose to dust and fall off of the working lining brick. The CaO of the slag must be greater than 40% by weight and the $CaO:Al_2O_3$ ratio must be greater than 0.94 by weight to form hydratable phases of calcium aluminates. The presence of silica in the slag was found to prevent formation of hydratable calcium aluminates and so the amount of silica should be kept below 6%. The dusts in both methods can be removed from the working lining bricks through a simple screening process, which would take place after tear out.

Figure 2:
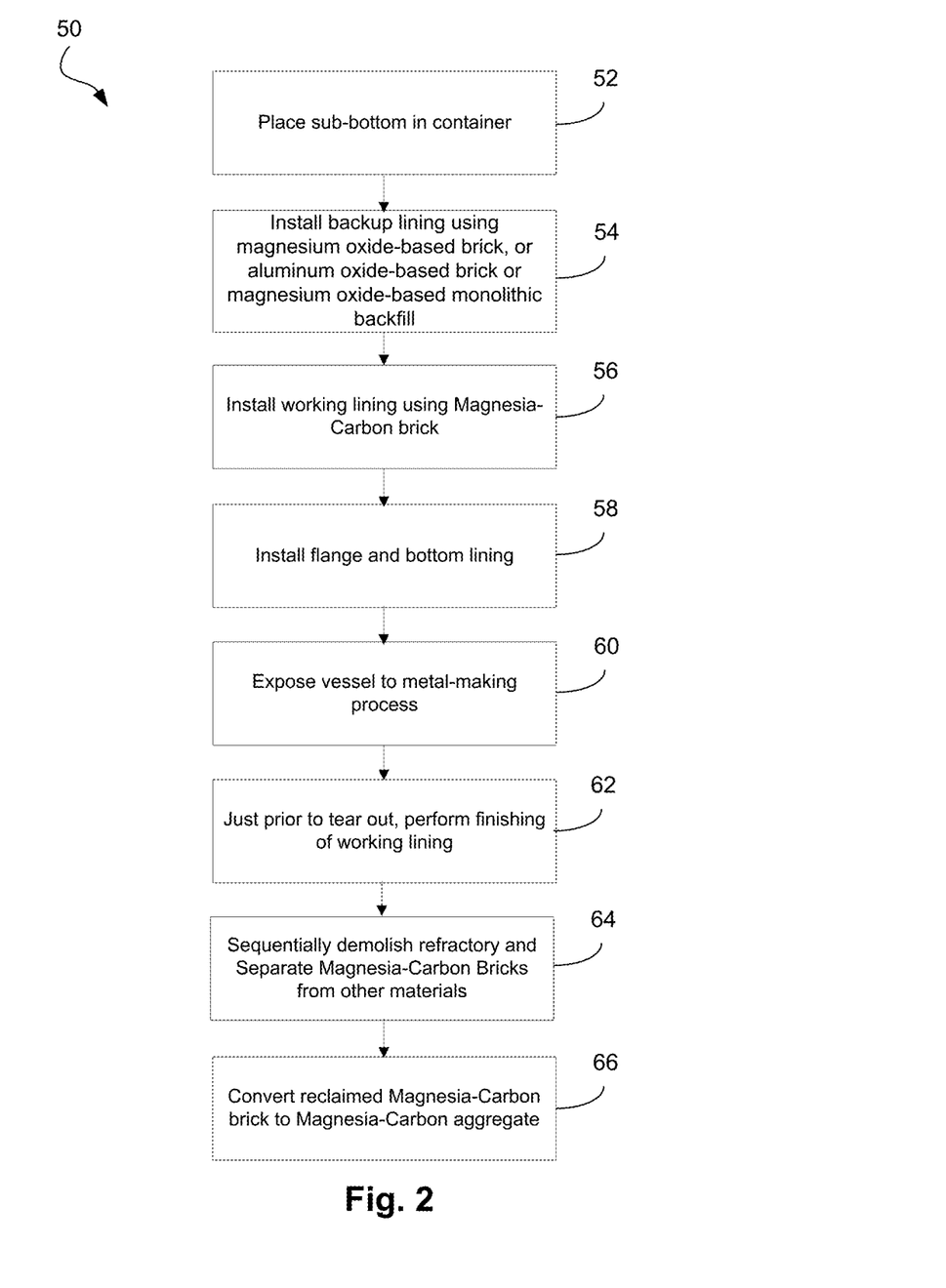
FIG. 2 is a flow chart showing the steps of an exemplary method for producing reclaimed Magnesia-Carbon from the metallurgical vessel of FIG. 1 in accordance with the invention.

According to another aspect of the invention, a method is provided for producing low-impurity Magnesia-Carbon reclaimed aggregate suitable for reuse in the production of high purity Magnesia-Carbon refractory. FIG. 2 illustrates the steps of a method 50 for producing low-impurity Magnesia-Carbon reclaimed aggregate in accordance with the invention. Beginning at step 52, a refractory is initially assembled by placing a sub-bottom 26 within a container structure 27. The sub-bottom 26 may be formed from Alumina Oxide-based refractory. Next at step 54, a backup lining 22 is arranged within the steel shell 27 of the metallurgical vessel 10 to define an outer-most surface of the backup lining 22, where the backup lining 22 is formed from at least one of Magnesium Oxide-based brick, Magnesium, or Aluminum Oxide-based brick or monolithic. At step 56 a working lining 12 is formed adjacent to, or with a gap between 1 to 2 inches wide from the backup lining 22. The gap is gradually, and in agreement with the forming of the working lining 12, filled with Magnesia Oxide-based backfill, creating a backfill layer 23, preferably formed from Magnesia monolithic having a Magnesia content exceeding 80 percent. The working lining 12 then defining an innermost wall 12a of the metallurgical vessel 10, where the working lining 12 is formed from high purity Magnesia-Carbon brick. Preferably, the Magnesia-Carbon brick has a purity of Magnesia that is greater than 95%. The Magnesia-Carbon brick is formed from materials as discussed above with respect to the working lining 12 of FIG. 1.

Next at step 58 the flange (lip ring) 28 is installed over the backup lining 22 and working lining 12, the flange 28 defining a top surface of the vessel. The flange 28 can be formed from Alumina-based castable or ram. Additionally, the bottom lining 24 is installed over the sub-bottom 26, the bottom lining 24 formed from Aluminum Oxide based refractory or the like. Such bottom construction is typically referred as Plug bottom. Alternatively, the bottom lining 24 could be installed over sub-bottom lining 26 after the back-up lining 22 is constructed and prior to the installation of working lining 12. Such bottom construction is referred as Full bottom. All other steps of the lining constructions remain the same.

Next at step 60 the assembled refractory is used to produce metals (e.g., steel), thereby exposing the working lining 12 to a metal making high temperature process. Once the refractory has reached a point in which it requires repair, the working lining 12 is prepared for tear out. More particularly, and just prior to tear out of the working lining 12, the working lining is "finished" as indicated at step 62. Such "finishing" can be implemented using a chemical de-slagging process and/or thermal de-slagging process. For example, for a chemical de-slagging process lime and/or fluorspar are added to a final batch of molten-metal processed in the refractory. Another finishing method includes tailoring the chemistry of the slag during the last heat to form dicalcium silicate that, during cooling, transitions from $\beta$ dicalcium silicate to $\gamma$ dicalcium silicate causing a 10% volume increase and dusting of the slag, which falls off the working lining brick. It is important that the slag is not quenched to allow for the transition of $\alpha$-C2S to $\beta$-C2S. The transition of $\beta$-C2S to $\gamma$-C2S occurs at 525 C, causing a 10% volume increase and dusting of the slag. The CaO of the slag must be greater than 40% by weight and the $CaO:SiO_2$ ratio must be greater than 1.4 by weight to form dicalcium silicate. Preferably, the $CaO:SiO_2$ ratio is between 1.4 to 1.87 by weight %, but ratios above 1.87 are permissible when Tri and Di Calcium Silicate can exist together. Yet another finishing method includes tailoring the chemistry of the slag during the last heat to form calcium aluminate-type slag, which after service hydrates and causes the slag to decompose to dust and fall off of the working lining brick. The CaO of the slag must be greater than 40% by weight and the $CaO:Al_2O_3$ ratio must be greater than 0.94 by weight to form hydratable phases of calcium aluminates. The presence of silica in the slag was found to prevent formation of hydratable calcium aluminates and so the amount of silica should be kept below 6%. For a thermal de-slagging process, the working lining 12 can be subjected to a final batch of molten metal that is above 3000 degrees F., or 100 to 500 degrees F. higher compared to typical melting temperature of the actual metallurgical process. The chemical and thermal de-slagging processes may be performed individually or in combination.

Figure 3:
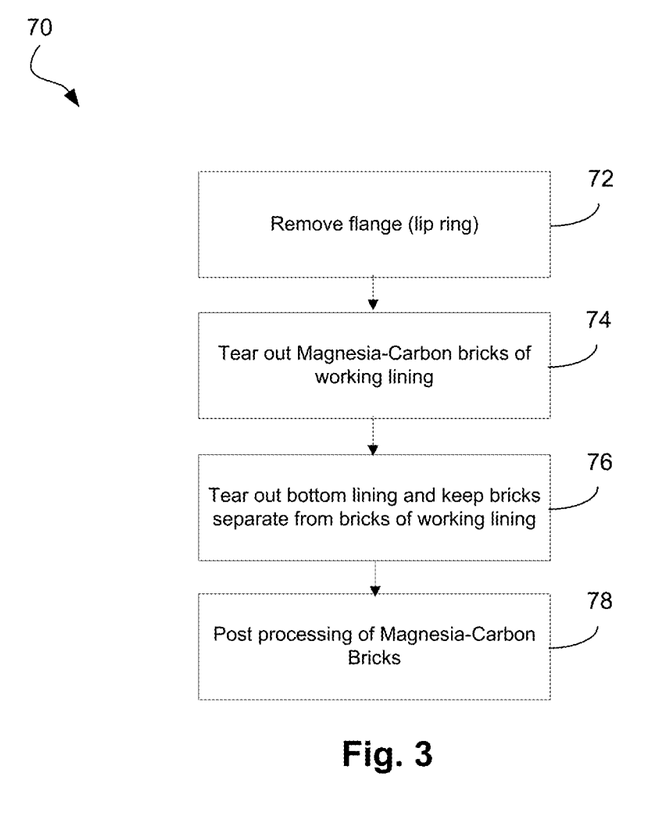
FIG. 3 is a flow chart showing the steps of an exemplary method for sequentially tearing out a refractory lining of the metallurgical vessel of FIG. 1 in accordance with the invention.

Once the working lining 12 has been "finished", at step 64 the refractory is sequentially demolished as discussed below with respect to FIG. 3, and the Magnesia-Carbon bricks are separated. At step 66 the Magnesia-Carbon bricks are converted into low impurity Magnesia-Carbon reclaimed aggregate. Such conversion can be performed, for example, by means of magnetic separation of remnant metal or by means of hydration and physical separation of slag, and by subsequent screening of the impure fines and by subsequent sizing of the coarse fraction into useable low impurity aggregate.

During demolition, proper sequencing should be followed to reduce or avoid contaminants in the reclaimed product. FIG. 3 illustrates the steps of a method 70 for a sequenced tear out of the lining (corresponding to step 64 in FIG. 2). Beginning at step 72 the flange 28 is removed from the vessel. The flange 28 is typically formed from an Alumina Oxide-based castable or ram (i.e., a moldable refractory plastic material that can be pushed into place), which should not be mixed with the Magnesia-Carbon working lining and thus is first removed during tear out. Next at step 74 all Magnesia-Carbon bricks of the working lining 12 are torn out (i.e., the barrel 14, lower slag line 16, upper slag line 18 and freeboard 20). The bricks from the working lining 12 form the source of the contamination-free (low impurity) Magnesia-Carbon reclamation product. Following tear out of the working lining 12, the bottom lining 24 is removed as indicated at step 76. The bottom lining 24 is typically preassembled AMC brick or precast Alumina-based refractory, which should not be mixed with the Magnesia-Carbon bricks torn out from the working lining 12.

Once the Magnesia-Carbon bricks have been torn out from the working lining, at step 78 post processing is performed to achieve a contamination-free (low impurity) Magnesia-Carbon reclamation product. One method of post processing includes, for example, magnetic separation of metal. Metal often infiltrates the joints between Magnesia-Carbon bricks and this metal needs to be separated from the Magnesia-Carbon reclamation product so that such metal does not contaminate the product. By using a magnetic device, the metal contaminants can be pulled away from the Magnesia-Carbon component. The process results in a low impurity Magnesia-Carbon product that has similar characteristics to virgin Magnesia-Carbon. The low impurity Magnesia-Carbon reclamation product then can be converted into an aggregate, and this aggregate can be used to create high quality refractory products.

Following the above steps, reclamation product in a form of an aggregate, having low impurity Magnesia-Carbon can be obtained. This reclamation product can be used to form new bricks that can be reused in new refractory lining of a metallurgical vessel. For example, a refractory that is resistant to steelmaking temperatures and steelmaking slags can be formed from low impurity Magnesia-Carbon reclaimed aggregate prepared from torn out Magnesia-Carbon bricks of a refractory assembled as described herein. The Magnesia-Carbon bricks of the working lining 12, for example, can be formed from up to 80% of the low impurity Magnesia-Carbon reclaimed aggregate and/or from at least one of complementary magnesia sintered aggregate having magnesia content above 95% or magnesia fused aggregate having magnesia content above 95%. Additionally, the reclamation product can be used to form Magnesia monolithic with up to 80% of low impurity Magnesia-Carbon reclaimed aggregate. This monolith could be in a form of castable, gunning mix, spray or dry-vibratable and would be typically useable as a repair materials for the working linings of metallurgical vessels. The magnesia-carbon monolithic can also include complementary Magnesia sintered aggregate, Magnesia fused aggregate, or Magnesia-dolomite aggregate.

Figure 4:
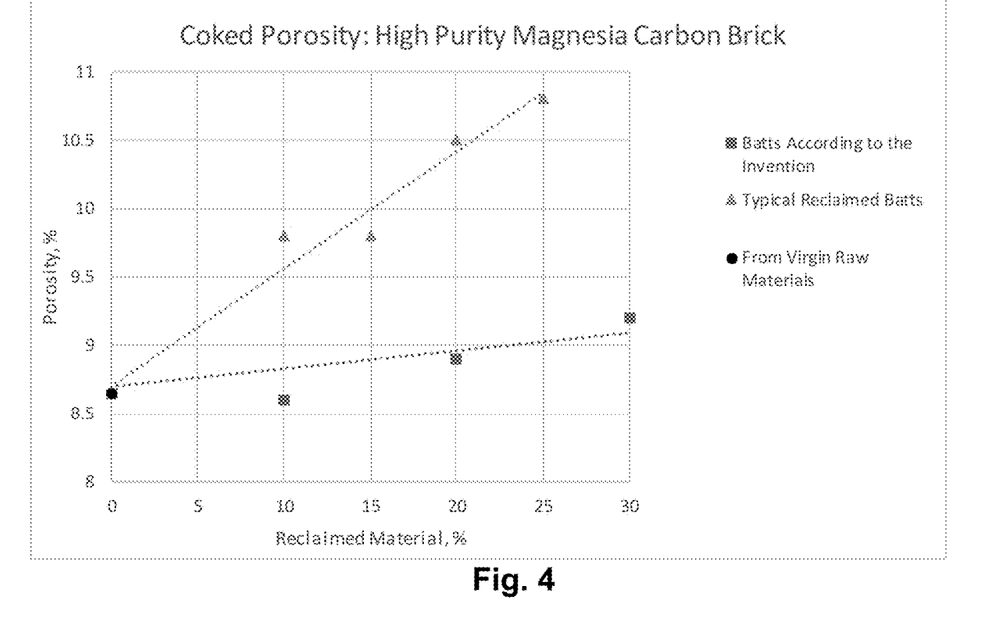
FIGS. 4 and 5 are graphs showing coked porosity and density of High Purity Magnesia Carbon Brick made with reclaimed batts according to the invention compared to typical reclaimed batts and brick made from virgin raw materials.
Figure 5:
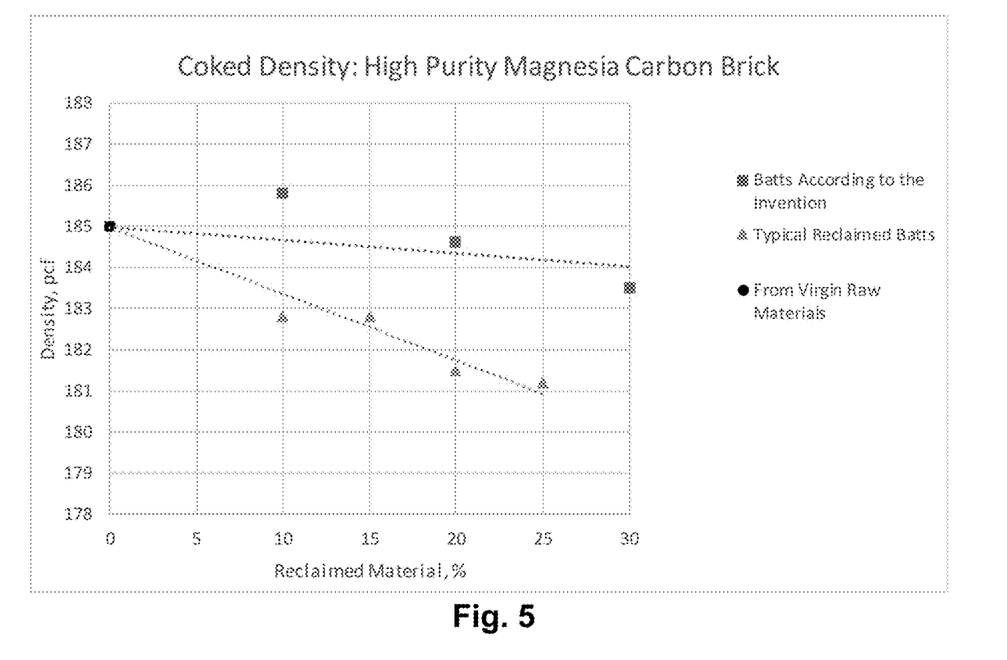

With reference to FIGS. 4 and 5, illustrated are the coked porosity and density of reclaimed batts according to the invention compared to typical reclaimed batts and brick made from virgin raw materials. In obtaining the data for FIGS. 4 and 5, batts according to the invention were crushed and sized to be used as a plus batt addition for Magnesia-Carbon brick used in steel ladle applications at 10, 20, and 30%. Adding the batts according to the invention to newly produced brick resulted in better-coked physical properties compared to bricks containing typical reclaimed batts that were added into new products at the same levels. Typical reclaimed batts contain, other than magnesia based contaminants, slag remnant contaminants or a low-density high-porosity Aluminum Hydroxide phase which, when used in Magnesia-Carbon brick, would lower the coked density and would increase porosity of the brick.

Adding batts according to the invention at 30% plus addition had no negative effect on corrosion/erosion resistance when compared to the standard mix made from virgin raw materials; conversely, the samples made with typical reclaimed batts at 30% plus addition show a step function worse corrosion/erosion loss and higher deviation between samples, as seen in Table 2 below. The chemistry of the synthetic slag was corresponding to a Silicon killed metallurgical de-oxidation treatment and had about 27% Silica, 6% Alumina, 50% of Lime, 11% of Iron Oxide and about 6% of Manganese Oxide.

TABLE 2

Comparison of Corrosion/Erosion Loss in Induction Furnace at 3050° F., after 6 hours, subjected to Si-Killed Steel

| | High Purity Magnesia Carbon Brick from Virgin Raw Materials | High Purity Magnesia Carbon Brick with 30% Batts According to the Invention | High Purity Magnesia Carbon Brick with 30% Typical Reclaimed Batts |
|---|---|---|---|
| Sample 1, Erosion Loss, mm$^2$ | 342 | 450 | 659 |
| Sample 2, Erosion Loss, mm$^2$ | 311 | 420 | 668 |
| Sample 3, Erosion Loss, mm$^2$ | 441 | 376 | 562 |
| Sample 4, Erosion Loss, mm$^2$ | 362 | 344 | 495 |
| Average, Erosion Loss, mm$^2$ | 364 | 398 | 596 |
| Standard Deviation | 48 | 41 | 72 |

In addition, batts according to the invention had decreased average oxidation while maintaining coked porosity, as seen in Table 3 below.

TABLE 3

Comparison of oxidation Percentages and Coked Porosity
when different batts are added to the mix

| Mix Description | Standard No Batts Added | With 30% Batts according to Invention | With 30% Typical Reclaimed Batts |
|---|---|---|---|
| Average Oxidation (%) | 46 | 36 | 60 |
| Coked porosity | 9 | 9.6 | 11.8 |

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. A method of producing low-impurity Magnesia-Carbon reclaimed aggregate, comprising:
   assembling a refractory with a backup lining comprising at least one of magnesium oxide-based brick, or aluminum oxide-based brick, or aluminum oxide-based monolithic and a working lining with at least one surface of the working lining adjacent to the backup lining, wherein the working lining comprises Magnesia-Carbon, and wherein assembling the refractory includes forming a gap between the backup lining and the working lining;
   filling the gap with magnesia based backfill;
   exposing the working lining to a metal making high temperature process;
   sequentially demolishing the working lining, and separating the Magnesia-Carbon brick; and
   producing low impurity Magnesia-Carbon reclaimed aggregate from the separated Magnesia-Carbon brick, the reclaimed aggregate suitable for reuse in production of high purity Magnesia-Carbon refractory.

2. The method according to claim 1, wherein assembling the refractory includes preventing the at least one surface of the working lining adjacent to the backup lining from adhering to the backup lining.

3. The method according to claim 1, wherein exposing the working lining includes finishing the working lining with one of a mechanical de-slagging process, a thermal de-slagging process or chemical de-slagging process, said finishing performed prior to demolition of the working lining.

4. The method according to claim 3, wherein finishing includes performing a destructive phase transition de-slagging process to tailor a chemistry of the slag to form dicalcium silicate that during cooling transforms from β to γ and causes the slag to dust and fall off of the working lining brick.

5. The method according to claim 3, wherein finishing includes performing a destructive hydration de-slagging process to hydrate calcium aluminate-type slag after service and cause the slag to decompose to dust and fall off of the working lining brick.

6. The method according to claim 4, further comprising using a screening process to remove the dust from other components.

7. The method according to claim 3, wherein finishing includes mechanical separation by skimming or pouring slag off the vessel before tapping.

8. The method according to claim 3, wherein finishing includes performing a thermal de-slagging process to the working lining to decrease a viscosity of the slag.

9. The method according to claim 8, wherein said thermal de-slagging process includes one of subjecting the working lining to a final batch of molten metal that is between 100 degrees F. and 500 degrees F. higher than a melting temperature of a batch of molten metal contacting the working lining just prior to the final batch, or subjecting the working lining to a final batch of molten metal that is above 3000 degrees F.

10. The method according to claim 1, wherein assembling the refractory includes using, as the backfill, Magnesia monolithic having a Magnesia content exceeding 80 percent.

11. The method according to claim 1, wherein assembling the refractory includes using Magnesia monolithic as the backfill, the Magnesia monolithic being at least one of castable, gunning mix, spray, ramming mix, dry-vibratable or plastic.

12. The method according to claim 1, wherein converting comprises using at least one of magnetic separation of remnant metal or hydration and physical separation of slag to convert the separated Magnesia-Carbon brick into low impurity Magnesia-Carbon reclaimed aggregate.

13. The method according to claim 1, wherein assembling the refractory includes using Magnesia-Carbon brick having a purity of Magnesia aggregate that is greater than 95% as the working lining.

14. The method according to claim 1, wherein assembling the refractory includes using metal-free Magnesia-Carbon brick as the working lining.

15. The method according to claim 1, wherein assembling the refractory includes using Magnesia-Carbon brick for the working lining, the Magnesia-Carbon brick comprising at least one carbon particulate in a range of 2 wt % to 20.0 wt %, the carbon particulate including at least one of natural flake graphite, vein graphite, synthetic graphite, expanded flake graphite, expandable graphite, carbon black, carbon fiber, and powdered pitch, and a binder in a range of 0.5 wt % to 5.0 wt %, the binder including at least one of phenolic resol resin, novolac resin, coal tar pitch, or petroleum pitch.

16. The method according to claim 1, wherein assembling the refractory includes using Magnesia-Carbon brick for the working lining, the Magnesia-Carbon brick comprising at least one anti-oxidation additive in a range of 0.25 wt % to 5.0 wt %, the anti-oxidation additive including at least one of metal, carbide, boride, and nitride.

17. A refractory that is resistant to steelmaking temperatures and steelmaking slags, comprising low impurity Magnesia-Carbon reclaimed aggregate prepared according to the method of claim 1.

18. The refractory according to claim 17, comprising Magnesia-Carbon brick formed from up to 80% of the low impurity Magnesia-Carbon reclaimed aggregate.

19. The refractory according to claim 17, comprising Magnesia-Carbon brick formed from at least one of complementary Magnesia sintered aggregate having Magnesia content above 95% or Magnesia fused aggregate having Magnesia content above 95%.

20. The refractory according claim 17, wherein the refractory comprises monolithic having up to 80% of low impurity Magnesia-Carbon reclaimed aggregate.

21. The refractory according to claim 20, wherein the monolithic comprises at least one of complementary Magnesia sintered aggregate, Magnesia fused aggregate, or Magnesia-dolomite aggregate.

22. A lining construction for a metallurgical vessel used to produce or refine metals, comprising:
a working lining having a first working lining side and a second working lining side opposite the first working lining side, the first working lining side facing an inner molten-metal holding region of the metallurgical vessel, the working lining comprising Magnesia-Carbon brick formed from low-impurity Magnesia-Carbon reclaimed aggregate obtained according to the method of claim 1.

23. The lining construction according to claim 22, further comprising a Magnesia-based backfill disposed between the backup lining and the working lining.

24. The lining construction according to claim 22, wherein the working lining comprises a barrel region, a lower slag line region, an upper slag line region and a freeboard region, the lower slag line region between the barrel region and the upper slag line region, and the upper slag line region between the lower slag line region and the freeboard region, and wherein each of the barrel region, the lower slag line region, the upper slag line region and the freeboard region comprise Magnesia-Carbon brick.

25. The lining construction according to claim 22, further comprising a bottom lining arranged adjacent to the barrel region, wherein the bottom lining comprises Aluminum Oxide based refractory.

26. The lining construction according to claim 25, wherein the bottom lining comprises a first bottom lining side and a second bottom lining side opposite the first bottom lining side, the first bottom lining side facing the inner molten-metal holding region.

27. The lining construction according to claim 26, further comprising a sub-bottom lining in contact with the second bottom lining side.

28. The lining construction according to claim 26, wherein the sub-bottom lining is in contact with at least one of the barrel region or the backup lining.

29. The lining construction according to claim 22, further comprising a flange distal from the bottom lining and adjacent to the working lining and the backup lining.

30. The lining construction according to claim 22, wherein the metallurgical vessel comprises one of an electric arc furnace, a steel ladle, or a basic oxygen furnace.

\* \* \* \* \*